US006416821B1

(12) United States Patent
Caron (10) Patent No.: US 6,416,821 B1
(45) Date of Patent: Jul. 9, 2002

(54) METHOD FOR COATING AN ORGANIC GLASS SUBSTRATE AND TREATING SOLUTION

(75) Inventor: Pierre Caron, Paris (FR)

(73) Assignee: Essilor International Compagnie General D'Optique, Charenton Cedex (FR)

( * ) Notice: Subject to any disclaimer, the term of this patent is extended or adjusted under 35 U.S.C. 154(b) by 0 days.

(21) Appl. No.: 09/632,439

(22) Filed: Aug. 4, 2000

Related U.S. Application Data (63) Continuation of application No. PCT/FR99/00234, filed on Feb. 3, 1999.

(30) Foreign Application Priority Data

Feb. 10, 1998 (FR) .............................................. 98 01548

(51) Int. Cl.$^7$ ................................................. H05H 1/00
(52) U.S. Cl. ...................... 427/536; 106/243; 106/287; 106/400; 427/164; 427/165; 427/322; 427/569; 427/578

(58) Field of Search ................................ 427/536, 165, 427/164, 322, 569, 578; 106/243, 287.1, 400

(56) References Cited

U.S. PATENT DOCUMENTS

| 4,338,375 A | 7/1982 | Hashimoto .................. 428/412 |
| 4,611,892 A | 9/1986 | Kawashima et al. ........ 351/159 |
| 5,104,692 A | 4/1992 | Belmares .................... 427/164 |

FOREIGN PATENT DOCUMENTS

| EP | 359026 | 3/1990 |
| JP | 60250044 | 12/1985 |
| WO | WO 95/04608 | 2/1995 |

Primary Examiner—Bernard Pianalto
(74) Attorney, Agent, or Firm—Fulbright & Jaworski LLP (57) ABSTRACT

The coating process according to the invention consists in bringing at least one surface of the substrate made of organic glass into contact with an aqueous treatment solution comprising at least one surface-active agent prior to the deposition of the coating on the surface of the substrate.

39 Claims, 6 Drawing Sheets

SURFACTANT EFFECT

HYDROCHLORIDE EFFECT (HC and HAC)

METHOD FOR COATING AN ORGANIC GLASS SUBSTRATE AND TREATING SOLUTION

This application is a continuation of international application number PCT/FR99/00234 filed Feb. 3, 1999, which is a continuation of French Application No. 98/01548 filed Feb. 10, 1998.

The present invention relates generally to a process for coating at least one surface of a substrate made of transparent organic glass which improves the adhesion of the coating to the substrate.

It is conventional, in the field of ophthalmic optics, to coat the surfaces of a substrate made of organic glass, such as an ophthalmic lens made of organic glass, for example a spectacle lens, with coatings such as hard abrasion-resistant and/or impact-resistant coatings, in order to improve the resistance of the ophthalmic lens obtained to scratches and to impacts.

A problem associated with these coated substrates made of organic glass relates to the adhesion of the coating to the substrate.

It would therefore be desirable to develop a process for coating a substrate made of organic glass which improves the adhesion of the coating to the organic glass and which can be applied to a large number of substrates made of organic glass where the substrates are different in nature.

The above aim is achieved according to the invention by providing a process for coating at least one surface of a substrate made of organic glass, such as an ophthalmic lens, for example a spectacle lens, which comprises, prior to the deposition of the coating on the surface of the substrate, a treatment stage comprising bringing the surface of the substrate into contact with an aqueous treatment solution comprising at least one surface-active agent.

In a recommended implementation of the invention, the stage of treatment with the aqueous solution of surface-active agent is followed by a stage of treatment of the surface with a basic solution, for example a 5% aqueous sodium hydroxide solution.

The process of the invention can also comprise, prior to the stage of treatment with the aqueous surfactant solution, a stage of treatment with plasma, in particular a conventional oxygen plasma. The use of such a stage of treatment with plasma of the substrate made of organic glass proves to be particularly advantageous when the organic glass of the substrate is a glass based on acrylic polymer.

For these organic polymers, the increase in the temperature of the treatment solution makes it possible appreciably to increase the adhesion of the coating. In particular, when the temperature of the solution is greater than or equal to 70° C., an excellent adhesion of the coating is obtained without involving a stage of treatment with plasma.

Very clearly, the coating process can comprise, between the various treatment stages, stages of cleaning with an alcohol and of rinsing with deionized water. In particular, it is recommended, subsequent to the stage of treatment with the solution comprising the surface-active agent and prior to the stage of treatment with the basic solution, to carry out a rinsing stage, preferably rinsing with deionized water, in order to remove the excess solution comprising the surface-active agent.

In general, during the stage of treatment with the aqueous solution of surface-active agent, the substrate is brought into contact with the solution for a period of 1 to 5 minutes, preferably at temperatures of the order of 30 to 90° C. and better still 40 to 60° C. The stage of treatment with the aqueous solution of surface-active agent is preferably carried out while concomitantly applying an ultrasound treatment.

In another recommended implementation of the invention, the aqueous treatment solution comprising the surface-active agent comprises dispersed pigments and thus also constitutes a bath for colouring the substrates, in particular ophthalmic lenses. In this case, the treatment is carried out at temperature of approximately 90° C. An excellent adhesion of a coating deposited subsequently on a coloured substrate (lens) is thus obtained. This technique exhibits two main advantages. On the one hand, it makes it possible to carry out, in a single stage, the colouring and the surface treatment for the adhesion and, on the other hand, it makes it possible to obtain an excellent adhesion of the coating even if the presence of pigments incorporated at the surface of the substrate has a tendency to degrade the properties of adhesion of the coatings.

The surface-active agents of use in the aqueous treatment solutions according to the invention can be any known surface-active agent and preferably anionic or nonionic surface-active agents.

Mention may be made, among surface-active agents recommended for the treatment solutions according to the invention, of alkyl sulphates, alkyl ether sulphates, alcoholamine alkyl sulphates, alkyl-benzenesulphonates and poly(ethylene glycol) alkylphenyl ethers.

Surface-active agents which are particularly recommended in the aqueous treatment solutions according to the invention are sodium lauryl sulphate (NaLS), sodium lauryl ether sulphate (NaLES), triethanolamine lauryl sulphate (TEALS), sodium dodecylbenzenesulphonate (NaDDBS) and PEG-9 octylphenyl ether (TRITON® X 100).

A surface-active agent which is particularly recommended according to the invention is sodium lauryl ether sulphate (NaLES).

The surface-active agent or agents present in the solution generally represent 0.01 to 0.1%, preferably 0.05 to 0.1%, by weight with respect to the total weight of the aqueous treatment solution.

The preferred aqueous treatment solutions according to the invention also comprise a hydrophilic polymer or colloidal hydrophilic inorganic filler or a mixture of these.

Mention may be made, among hydrophilic polymers recommended in the treatment solutions according to the invention, of poly(vinyl alcohol)s (PVA), poly(ethylene glycol)s (PEG), polyacrylamides (PAM), polyvinyl-pyrrolidones (PVP) and cellulose derivatives, such as hydroxy alkyl celluloses, such as hydroxy ethyl cellulose and hydroxy propyl cellulose, alkyl hydroxy alkyl celluloses, such as methyl hydroxy propyl cellulose, and carboxy alkyl celluloses, such as carboxy methyl cellulose.

Mention may be made, among hydrophilic colloidal inorganic fillers suitable in the aqueous treatment solutions according to the invention, of silica fillers, alumina fillers and their mixtures, in particular pyrogenic silica and alumina fillers.

The hydrophilic polymer or polymers and/or the hydrophilic colloidal inorganic fillers are generally present in the aqueous treatment solution according to the invention in a proportion of 0.001 to 0.05%, preferably 0.005 to 0.02%, by weight with respect to the total weight of the aqueous treatment solution.

Aqueous treatment solutions which are recommended according to the invention are solutions which comprise an anionic surfactant and a hydrophilic polymer and/or a nonionic or cationic colloidal inorganic filler.

Aqueous treatment solutions according to the invention which are particularly preferred additionally comprise a hydroxylamine salt and/or a hydrazine salt, such as, for example, hydroxylamine hydrochloride and/or hydrazine hydrochloride.

When it is present, this hydrazine or hydroxylamine salt represents 0.02 to 0.1% by weight with respect to the total weight of the aqueous treatment solution.

Preferably again, the aqueous treatment solutions according to the invention have an acidic pH, generally from 2 to 5. This acidic pH can be obtained by addition of an acid, preferably lactic acid, to the solution, if necessary.

The amount of lactic acid present in the aqueous treatment solution generally represents 0 to 0.01% by weight with respect to the total weight of the aqueous treatment solution.

The present invention thus also relates to an aqueous treatment solution for the implementation of the process of the invention which comprises a surface-active agent, a hydrophilic polymer and/or a hydrophilic colloidal inorganic filler, a hydrazine salt and/or a hydroxylamine salt, and an acid.

An aqueous treatment solution which is preferred according to the invention comprises (the % being expressed by weight with respect to the total weight of the aqueous treatment solution):

0.01 to 0.1% of at least one surface-active agent;
0.001 to 0.05% of a hydrophilic polymer and/or of a hydrophilic colloidal inorganic filler;
0.02 to 0.1% of a hydrazine salt and/or a hydroxylamine salt; and
up to 0.01% of acid, preferably lactic acid.

The substrates made of organic glass which can be treated in the process of the invention are all substrates made of transparent organic glass for which it is necessary to improve the surface condition for the purpose of facilitating the subsequent adhesion of a treatment and in particular of an abrasion-resistant coating.

Mention may be made, among these substrates, of substrates based on (meth)allyl polymer, substrates based on (meth)acrylic polymer, substrates based on thio(meth) acrylic polymer, substrates based on poly(thio)urethane and substrates based on thermoplastic polycarbonate.

The preferred substrates are of (meth)allyl, (meth)acrylic and poly(thio)urethane type.

A first family of substrates is composed of those obtained from polymerizable compositions comprising (meth)allyl monomers or prepolymers derived from bisphenol A, in particular bisphenol A bis(allyl carbonate).

The latter can be used alone or as a mixture with other copolymerizable monomers, in particular with di(ethylene glycol) bis(allyl carbonate).

Substrates which are more particularly recommended, as well as their process of preparation, appear in the Patent Documents EP 224,123 and FR 2,703,056.

A second family of substrates is composed of those obtained from polymerizable compositions comprising (meth)acrylic monomers or prepolymers derived from bisphenol A, in particular bisphenol A dimethacrylate or poly(ethoxy)bisphenol A dimethacrylate.

Such substates are disclosed, inter alia, in Patent EP 605,293.

A third family of substrates is composed of those obtained from compositions including at least one polythiol compound and at least one polyisocyanate compound which result in a polythiourethane substrate.

Such substrates, as well as their process of preparation, are disclosed more particularly in U.S. Pat. Nos. 4,689,387 and 4,775,733.

To facilitate the release of such substrates from a mould, it is possible to incorporate internal mould-release agents.

Such agents are disclosed in Patent EP 271,839.

The preferred mould-release agents are hydrogen phosphates, such as dibutyl phosphate.

The consequence of the presence of the internal mould-release agent is a decrease in the adhesion of the treatments, in particular of the coatings, subsequently deposited on the substrate.

The invention is therefore of particular advantage in the case of substrates comprising such mould-release agents.

A fourth family is that composed of polycarbonate materials (thermoplastics).

The coatings which can be deposited on the substrates made of organic glass pretreated according to the invention are all coatings conventionally used in the field of ophthalmic optics, such as hard abrasion-resistant and/or impact-resistant coatings.

Mention may be made, among abrasion-resistant coatings recommended in the present invention, of coatings obtained from compositions based on silane hydrolysate, in particular on epoxysilane hydrolysate, for example those disclosed in Patent EP 0,614,957, or from the compositions based on (meth)acrylic derivatives.

An abrasion-resistant coating composition which is particularly recommended in the process according to the invention is a composition comprising a γ-glycidoxypropyltrimethoxysilane hydrolysate, optionally a dimethyldiethoxysilane hydrolysate, colloidal silica and aluminium acetylacetonate.

Another coating which can be envisaged is a coating based on polyurethane, in particular polyurethane latex.

The deposition of the coating on the surface of the substrate made of organic glass, which surface is treated according to the invention, is carried out conventionally by application of a solution of the coating composition and then conventional hardening of this composition.

The process according to the invention generally makes it possible to obtain an excellent adhesion of the coatings subsequently deposited on the pretreated substrate made of organic material and in particular coatings themselves made of organic material.

The process makes it possible to avoid any mechanical surface brightening treatment which will be harmful to the transparency.

In addition, it results in coated substrates, in particular ophthalmic lenses, having an excellent cosmetic appearance.

BRIEF DESCRIPTION OF THE DRAWINGS

The continuation of the description refers to the appended figures, which respectively represent.

In the following examples, except when otherwise indicated, all the parts and percentages are expressed by weight.

Aqueous treatment solutions according to the invention T14 to T34, having the compositions shown in Table I below, were prepared from a mother solution diluted a hundredfold.

TABLE I

| Composition of the aqueous treatment solutions (% by weight) | | | | | | | | | | |
|---|---|---|---|---|---|---|---|---|---|---|
| | T14 | T15 | T16 | T17 | T18 | T19 | T20 | T21 | T22 | T23 |
| Surfactant | | | | | | | | | | |
| NaLS | 0.054 | 0.054 | 0.054 | 0.054 | 0.054 | 0.054 | 0.054 | 0.054 | 0.054 | — |
| TEALS | — | — | — | — | — | — | — | — | — | 0.054 |
| TRITON ® x 100 | — | — | — | — | — | — | — | — | — | — |
| NaLES | — | — | — | — | — | — | — | — | — | — |
| NaDDBS | — | — | — | — | — | — | — | — | — | — |
| Hydrophilic polymer | | | | | | | | | | |
| HEC | — | 0.01 | — | — | — | — | — | — | — | 0.01 |
| PVP | — | — | 0.01 | — | — | — | — | — | — | — |
| CMC | — | — | — | 0.01 | — | — | — | — | — | — |
| MHPC | — | — | — | — | 0.01 | — | — | — | — | — |
| HPC | — | — | — | — | — | 0.01 | — | — | — | — |
| PVA | — | — | — | — | — | — | 0.01 | — | — | — |
| PEG | — | — | — | — | — | — | — | 0.01 | — | — |
| PAM | — | — | — | — | — | — | — | — | 0.01 | — |
| Colloidal inorganic filler | | | | | | | | | | |
| $SiO_2$ | — | — | — | — | — | — | — | — | — | — |
| $Al_2O_3$ | — | — | — | — | — | — | — | — | — | — |
| Doping agent | | | | | | | | | | |
| HC | — | — | — | — | — | — | — | — | — | — |
| HAC | — | — | — | — | — | — | — | — | — | — |
| Other adjuvants | | | | | | | | | | |
| Lactic acid | 0.011 | 0.011 | 0.011 | 0.011 | 0.011 | 0.011 | 0.011 | 0.011 | 0.011 | 0.011 |
| Na methylparaben | 0.0015 | 0.0015 | 0.0015 | 0.0015 | 0.0015 | 0.0015 | 0.0015 | 0.0015 | 0.0015 | 0.0015 |
| Deionized water | | | | | | | | | | |
| q.s. for | 100 | 100 | 100 | 100 | 100 | 100 | 100 | 100 | 100 | 100 |

| | T24 | T25 | T26 | T27 | T28 | T29 | T30 | T31 | T32 | T33 | T34 |
|---|---|---|---|---|---|---|---|---|---|---|---|
| Surfactant | | | | | | | | | | | |
| NaLS | — | — | — | 0.054 | 0.054 | 0.054 | 0.054 | 0.054 | 0.054 | — | — |
| TEALS | — | — | — | — | — | — | — | — | — | — | — |
| TRITON ® x 100 | 0.054 | — | — | — | — | — | — | — | — | — | — |
| NaLES | — | 0.054 | — | — | — | — | — | — | — | 0.054 | 0.054 |
| NaDDBS | — | — | 0.054 | — | — | — | — | | | | |
| Hydrophilic polymer | | | | | | | | | | | |
| HEC | 0.01 | 0.01 | 0.01 | 0.02 | 0.01 | — | — | 0.01 | 0.01 | 0.01 | 0.01 |
| PVP | — | — | — | — | — | — | — | — | — | — | — |
| CMC | — | — | — | — | — | — | — | — | — | — | — |
| MHPC | — | — | — | — | — | — | — | — | — | — | — |
| HPC | — | — | — | — | — | — | — | — | — | — | — |
| PVA | — | — | — | — | — | — | — | — | — | — | — |
| PEG | — | — | — | — | — | — | — | — | — | — | — |
| PAM | — | — | — | — | — | — | — | — | — | — | — |
| Colloidal inorganic filler | | | | | | | | | | | |
| $SiO_2$ | — | — | — | — | — | 0.01 | 0.0084 | — | — | — | — |
| $Al_2O_3$ | — | — | — | — | — | — | 0.0016 | | | | |

TABLE I-continued

Composition of the aqueous treatment solutions (% by weight)

| Doping agent | | | | | | | | | | | |
|---|---|---|---|---|---|---|---|---|---|---|---|
| HC | — | — | — | — | — | — | — | 0.02 | — | 0.02 | — |
| HAC | — | — | — | — | — | — | — | — | 0.02 | — | 0.02 |
| Other adjuvants | | | | | | | | | | | |
| Lactic acid | 0.011 | 0.011 | 0.011 | 0.011 | | 0.011 | 0.011 | 0.011 | 0.011 | 0.011 | 0.011 |
| Na methylparaben | 0.0015 | 0.0015 | 0.0015 | 0.0015 | 0.0015 | 0.0015 | 0.0015 | 0.0015 | 0.0015 | 0.0015 | 0.0015 |
| Deionized water | | | | | | | | | | | |
| q.s. for | 100 | 100 | 100 | 100 | 100 | 100 | 100 | 100 | 100 | 100 | 100 |

Surfactants

NaLS: Sodium lauryl sulphate
TEALS: Triethanolamine lauryl sulphate
TRITON ® × 100: PEG-9 octylphenyl ether
NaLES: Sodium lauryl ether sulphate
NaDDBS: Sodium dodecylbenzenesulphonate.

Hydrophilic polymers

HEC: Hydroxy ethyl cellulose
PVP: Polyvinylpyrrolidone
CMC: Carboxy methyl cellulose
MHPC: Methyl hydroxy propyl cellulose
HPC: Hydroxy propyl cellulose
PVA: Poly(vinyl alcohol)
PEG: Poly(ethylene glycol)
PAM: Polyacrylamide Inorganic Fillers
Pyrogenic Silica and Pyrogenic Alumina The various substrates made of organic glass which are treated are defined below:

Substrate A is obtained by thermal polymerization of a polymerizable composition including:
  91% of bisphenol A bis(allyl carbonate), sold by the Company PPG under the name CR 73® or HIRI1®,
  7% of di(ethylene glycol) bis(allyl carbonate), sold by the Company PPG under the name CR 39®, and a sufficient amount of diisopropyl peroxydicarbonate as polymerization catalyst.

Substrate B is obtained by photopolymerization of a polymerizable composition including:
  98% by weight of D 121® [tetraethoxybisphenol A di(meth)acrylate, sold by the Company Akzo],
  2% of 3-methyl-2-buten-1-ol and photoinitiator CGI 1700®, sold by the Company Ciba-Geigy (0.1% by weight).

The composition is cast in a mould made of transparent inorganic glass and then irradiated under a mercury lamp for 5 minutes. The lens is then subjected to annealing for 1 hour at 120° C.

The final article, after removing from the mould, exhibits a thickness at the centre of 2 mm.

Substrate C is obtained from a mixture comprising, as sole polymerizable monomers:
  m-xylylene diisocyanate (XDI), 769.2 g,
  pentaerythritol tetrakis(3-mercaptopropionate) (PETMP), 1000 g, and an appropriate amount of dibutyltin dilaurate (50–5000 ppm, preferably 2500–5000 ppm).

A thermal polymerization is subsequently carried out for 24 hours, beginning between 25 and 50° C., followed by a rise in temperature to 100–135° C. and then a decrease in the temperature to 50–75° C. The ophthalmic lens is then removed from the mould. It exhibits a thickness at the centre of less than 3 mm.

Substrate D is obtained in the same way as Substrate C but the polymerizable composition from which this substrate is formed comprises an internal mould-release agent composed of the mixture of following compounds:

0.2% of dibutyl phosphate (source: Johoko: identified as being a mixture of 55% by weight of dibutyl phosphate and 45% of monobutyl phosphate), 0.06% of Zelec® UN (phosphoric acid $C_8$–$C_{16}$ ester).

(The percentages of mould-release agents are expressed by weight with respect to the XDI+PETMP total weight).

Substrate E is a substrate obtained by polymerization of the following polymerizable composition, disclosed in Patent Application WO 95/10790.

| Basic ingredients | Parts by weight |
|---|---|
| Ethoxybisphenol A dimethacrylate comprising 2.5 epoxy units | 43.5 |
| Poly(ethylene glycol) with a molecular mass of 66 terminated at both ends by methacyrlate | 21.0 |
| 1,3-Diisopropenylbenzene | 6.0 |
| 2-Phenoxyethyl methacrylate | 20.5 |
| Poly(ethylene glycol) with a molar mass of 200 with a benzoate ending at the two ends | 8.7 |
| Triphenyl phosphite | 0.3 |
| Initiator | |
| Diisopropyl peroxydicarbonate | 1.5 |
| tert-Butyl peroxy(2-ethylcarbonate) | 0.5 |

The polymerizable composition is cast in a mould. The mould is placed in a circulating air oven and the composition is cured by using the following curing cycle.

| Cumulative hours | Temperature of the oven, ° C. |
|---|---|
| 0 | 34 |
| 24 | 36 |
| 32 | 44 |
| 34 | 46 |
| 36 | 48 |
| 38 | 50 |
| 40 | 54 |
| 42 | 58 |
| 44 | 64 |
| 46 | 69 |
| 48 | 85 |
| 49 | 105 |
| 49.5 | 130 |
| 50.5 | 130 (end of cycle) |

The polymerisate is left to cool in the oven to approximately 80° C. and is then taken out and removed from the mould.

The various substrates were subjected, prior to the deposition of the coating, to the treatment below.

As regards Substrates C, D and A, the substrates were initially precleaned manually with alcohol, dipped for 4 minutes in the aqueous treatment solution according to the invention, held at a temperature of 50° C., while being subjected to an ultrasound treatment, rinsed by dipping in a bath of deionized water, then treated successively in a bath of 5% sodium hydroxide and in a bath of deionized water, and then cleaned in a bath of alcohol.

Substrates E and B, for their part, were subjected to the same treatment as above but comprising, after the first precleaning with alcohol, an additional treatment with oxygen ($O_2$) plasma (1200 W microwave plasma, for 5 minutes, flow rate 200 ml/min).

By way of comparison, the same substrates, prior to the deposition of the coating, were subjected to treatments analogous to those described above but not comprising the stage of treatment with an aqueous solution according to the invention. The substrates which have been subjected to this treatment are identified by REF in the figures.

All the substrates are subsequently coated with a hard abrasion-resistant coating composition corresponding to Example 3 of Patent EP-0,614,957 as indicated in this example.

More particularly, a coating solution was prepared by adding 8.05 parts of 0.1N hydrochloric acid dropwise to a solution comprising 224 parts of γ-glycidoxypropyltrimethoxysilane and 120 parts of dimethyldiethoxysilane. The hydroxylated solution is stirred for 24 hours at room temperature and then 718 parts of 30% colloidal silica in methanol, 15 parts of aluminium acetylacetonate and 44 parts of ethyl cellosolve are added. A small amount of surface-active agent is added. The theoretical solid content of the composition comprises of the order of 13% of solid matter originating from the dimethyldiethoxysilane.

The composition is applied to the substrates by dip coating and the coated substrates are subsequently subjected to prebaking for 15 minutes at 60° C. and to stoving at 110° C. for 3 hours.

The substrates, coated with the abrasion-resistant coating, are then recovered and are then subjected to adhesion tests.

The adhesion of the coatings to the substrates was measured according to AFNOR Standard 76 SNT 30038, which consists in using a cutter to cut incision lines in the coatings according to a squared layout, in applying an adhesive tape to the coating which has thus been squared and in attempting to pull it off using the tape.

The adhesion of the coatings is measured on substrates under dry conditions and after they have been immersed for 30 minutes in a bath of boiling water, taken out of the bath and then brought back to room temperature.

The results are considered as good when the edges of the incisions made remain perfectly smooth and none of the squares which they delimit become detached.

The output (percentage of glass items (substrates) good to the test under dry conditions and, if they are all good under dry conditions, after ½ hour of boiling water) is then recorded.

If the substrates successfully pass the test of ½ hour with boiling water, the same glass items are again immersed for 30 minutes in a bath of boiling water, taken out of the bath and then brought back to room temperature.

The same adhesion test is then carried out as described above. The outputs (percentage of good glass items) after 1 hour of boiling water are recorded.

The level of adhesion was determined as shown in Table II below.

The results of these adhesion tests are shown in FIGS. 1 to 6.

TABLE II

| TEST | LEVEL | OUTPUT: % of good glass items (grade 0 to 1) |
|---|---|---|
| 1H B.W. | 300 | 100% of the glass items are good after 1H B.W. |
|  | 280 |  |
|  | 260 | 60% of the glass items are good after 1H B.W. |
|  | 240 |  |
|  | 220 |  |
| ½H B.W. | 200 | 100% of the glass items are good after ½H B.W. |
|  | 180 |  |
|  | 160 | 60% of the glass items are good after ½H B.W. |
|  | 140 |  |
|  | 120 |  |
| Dry | 100 | 100% of the glass items are good under dry conditions |
|  | 80 |  |
|  | 60 | 60% of the glass items are good under dry conditions |
|  | 40 |  |
|  | 20 |  |
|  | 0 | 0% of the glass items are good under dry conditions |

Figure 1:
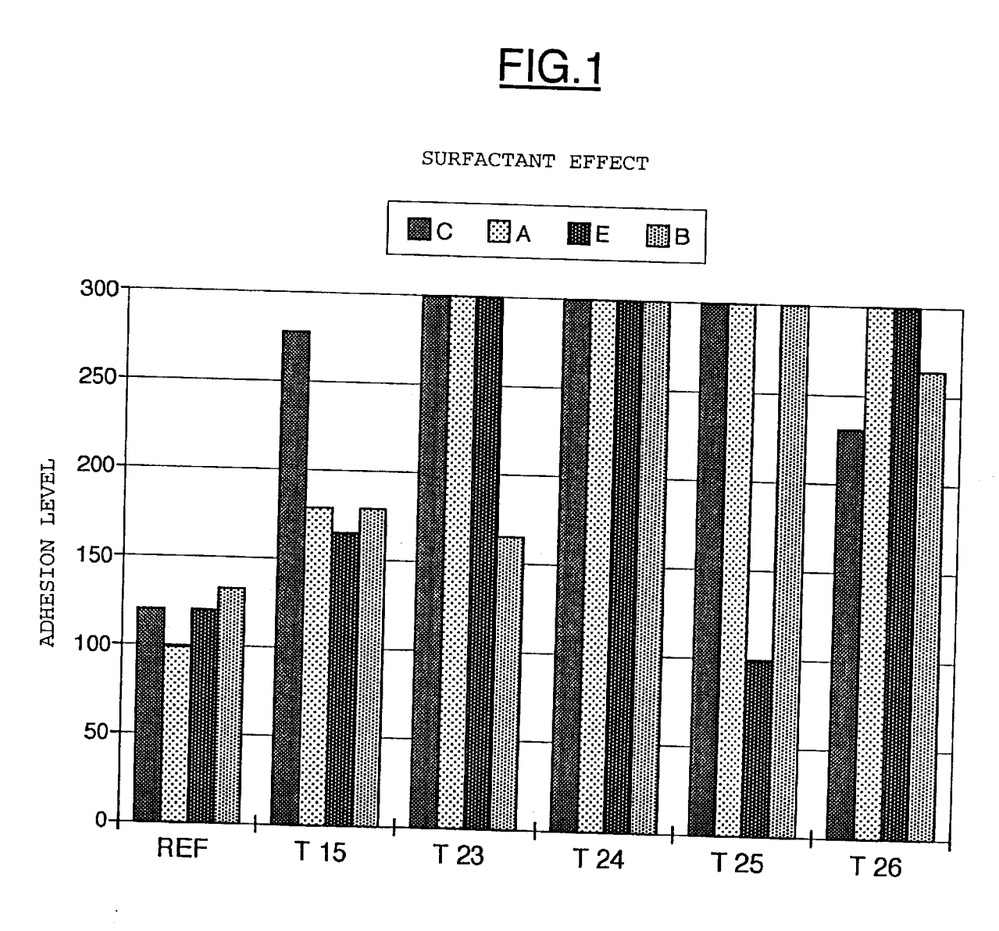
FIG. 1—the level of adhesion of the coating to various substrates made of organic glass which are treated with aqueous treatment solutions according to the invention comprising various surfactants.

FIG. 1 shows that the treatment using an aqueous solution comprising a surface-active agent according to the invention results in a better adhesion of the coating to the substrate made of organic glass with respect to reference substrates which have not been treated with a solution according to the invention.

Figure 2:
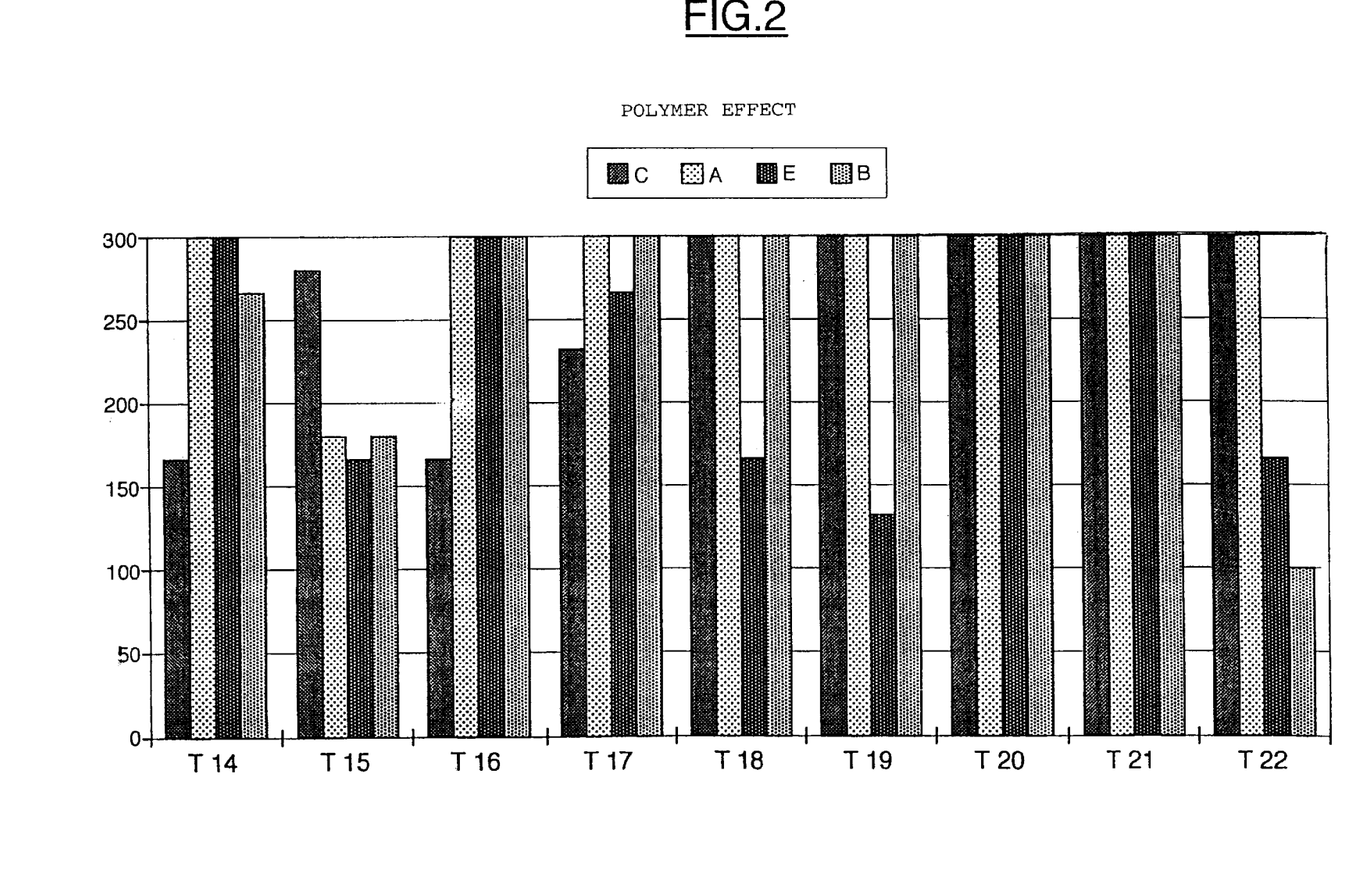
FIG. 2—a graph of the level of adhesion of a coating to various substrates made of organic glass which are treated by the process of the present invention with various aqueous treatment solutions according to the invention comprising various hydrophilic polymers.

FIG. 2 shows the adhesion results obtained with treatment solutions comprising various hydrophilic polymers and that it is possible to classify the tested polymers in the following way: PVA>PEG>HPC,MHPC>PAM>PVP>CMC.

Figure 3:
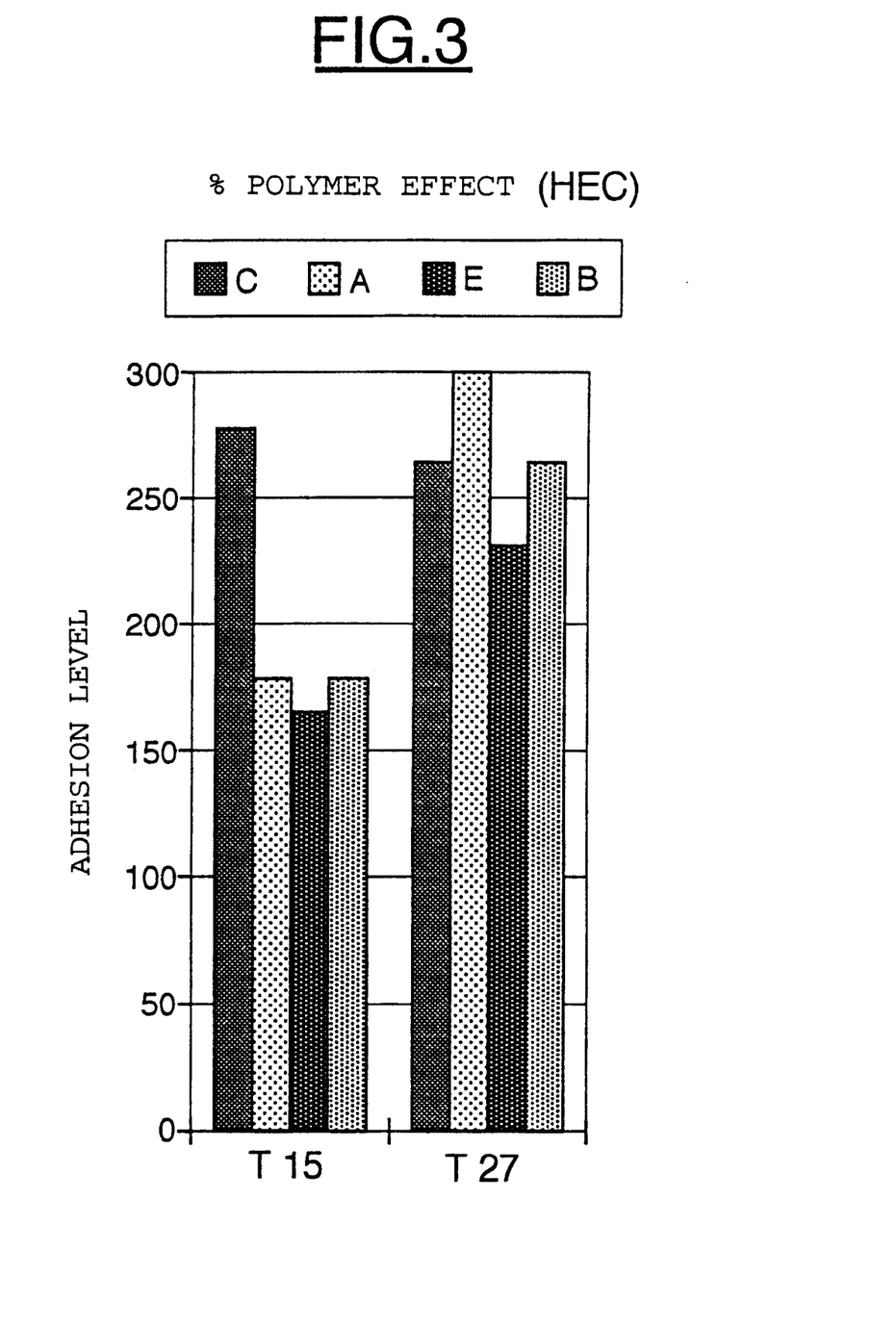
FIG. 3—a graph of the level of adhesion of the coating for various substrates made of organic glass which are treated by the process according to the invention with two aqueous treatment solutions according to the invention comprising sodium lauryl sulphate as surface-active agent and hydroxy ethyl cellulose as hydrophilic polymer but in different concentrations.

FIG. 3 shows that the increase in the level of hydrophilic polymers in the aqueous treatment solution generally increases the level of adhesion.

Figure 4:
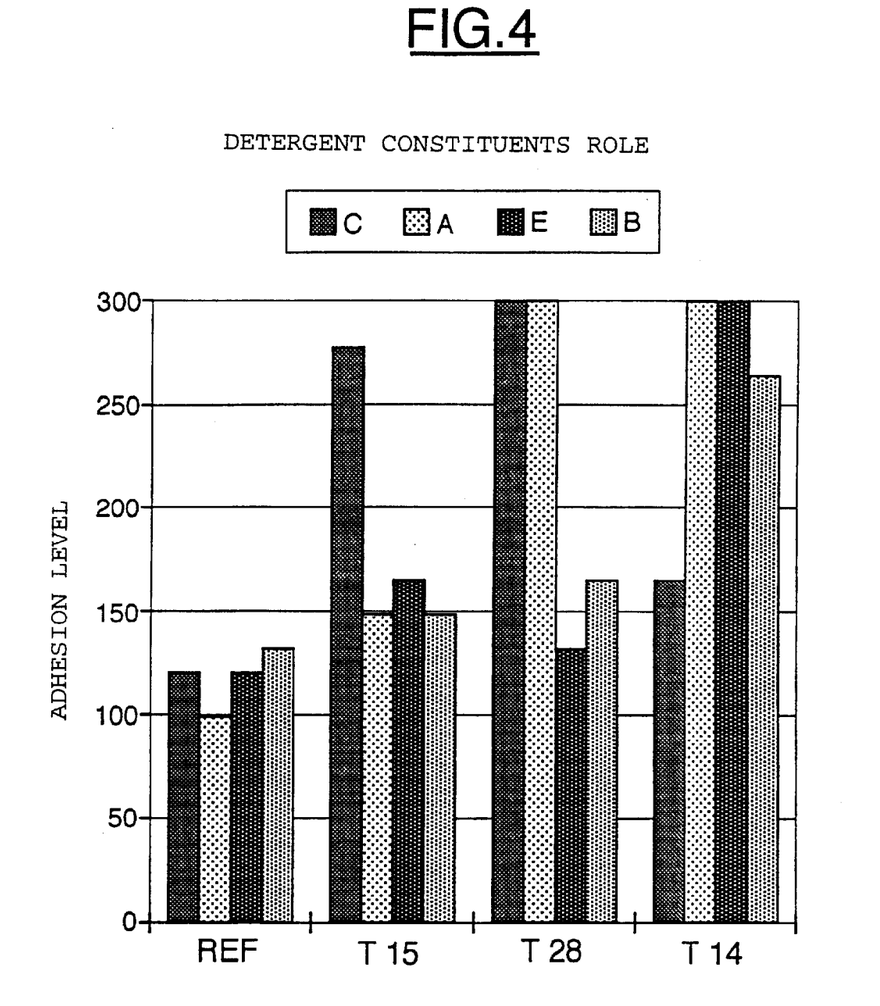
FIG. 4—a graph of the level of adhesion of the coating to various substrates made of organic glass which are treated by the process of the invention with various aqueous treatment solutions according to the invention.

FIG. 4 shows that the omission of lactic acid (change in the pH of the solution from 3 to 10) does not have a major effect on the effectiveness of the solution.

Figure 5:
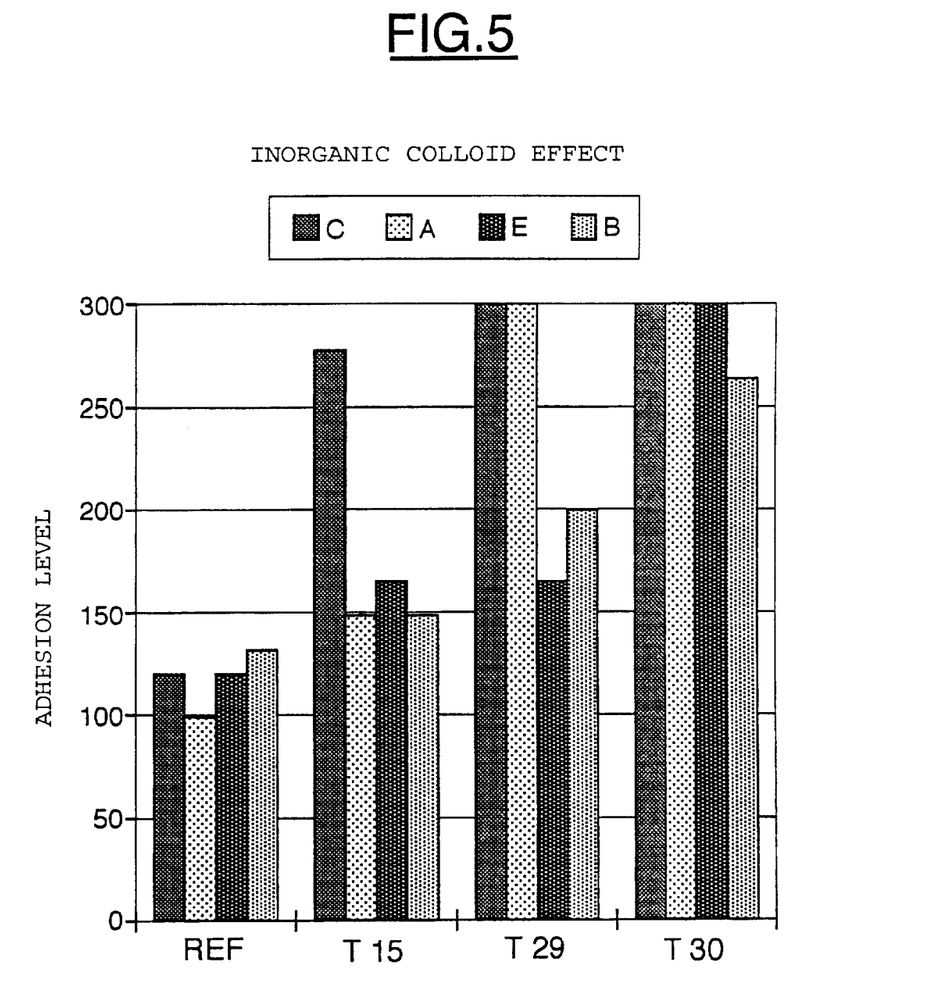
FIG. 5—a graph of the level of adhesion of the coating to various substrates made of organic glass which are treated by the process according to the invention with various other aqueous treatment solutions according to the invention comprising an inorganic colloid.

FIG. 5 shows that the use of hydrophilic colloidal inorganic fillers instead of hydrophilic polymers does not substantially modify the effect of the treatment solution with respect to the adhesion of the coating.

Figure 6:
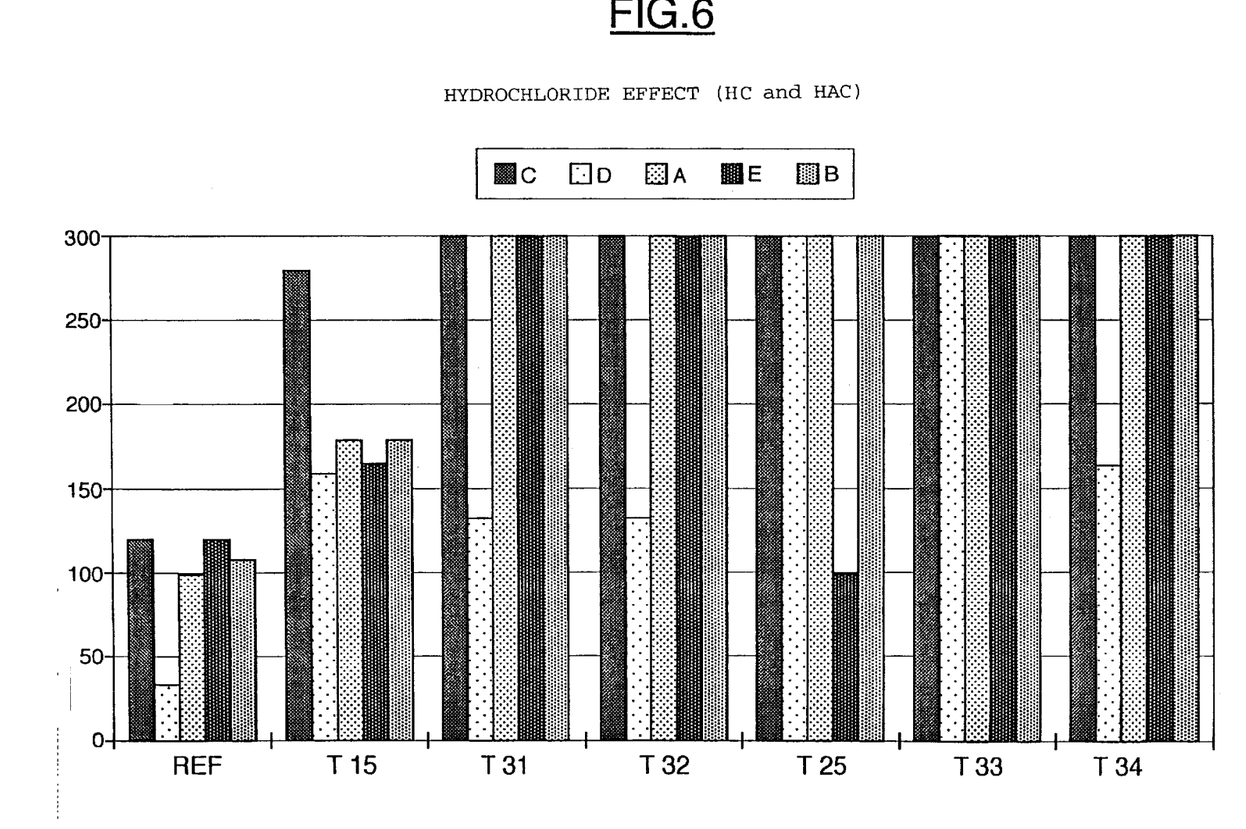
FIG. 6—a graph of the level of adhesion of the coating to various substrates made of organic glass which are treated by the process according to the invention with various aqueous treatment solutions according to the invention including hydrazine hydrochloride or hydroxylamine hydrochloride.

FIG. 6 shows that the best results are obtained for the aqueous treatment solutions according to the invention additionally comprising a doping agent chosen from hydrazine salts and hydroxylamine salts.

What is claimed is:

1. A process for coating at least one surface of a substrate made of organic glass, comprising, prior to the deposition of the coating on the surface of the substrate, a treatment comprising bringing the surface of the substrate in contact with an aqueous treatment solution comprising at least one surface-active agent and having an acidic pH.

2. The process of claim 1, further comprising, subsequent to the treatment with the aqueous solution of surface-active agent, treatment of the surface with a basic solution.

3. The process of claim 2, wherein the basic solution is a 5% aqueous sodium hydroxide solution.

4. The process of claim 2 further comprising, subsequent to the treatment with the solution comprising the surface-active agent and prior to the treatment with the basic solution, a rinsing to remove the excess solution comprising the surface-active agent.

5. The process of claim 4, wherein the rinsing is with deionized water.

6. The process of claim 1, further comprising, prior to the treatment with the aqueous solution of surface-active agent, treatment with plasma.

7. The process of claim 1, wherein the surface-active agent comprises one or more anionic and/or one or more nonionic surfactants.

8. The process of claim 7, wherein the surface-active agent is sodium lauryl sulphate, sodium lauryl ether sulphate, triethanolamine lauryl sulphate, sodium dodecylbenzene-sulphonate, or PEG-9 octylphenyl ether.

9. The process of claim 1, wherein the surface-active agent is sodium lauryl ether sulphate.

10. The process of claim 1, wherein the surface-active agent comprises 0.01 to 0.1% by weight of the total weight of the aqueous treatment solution.

11. The process of claim 1, wherein the aqueous treatment solution comprises a hydrophilic polymer, a hydrophilic colloidal inorganic filler, or a mixture of these.

12. The process of claim 11, wherein the hydrophilic polymer comprises at least one poly(vinyl alcohol), poly(ethylene glycol), polyacrylamide, polyvinylpyrrolidone, or cellulose derivative.

13. The process of claim 12, further defined as comprising a cellulose derivative chosen from the group consisting of hydroxy alkyl celluloses, alkyl hydroxy alkyl celluloses and carboxy alkyl celluloses.

14. The process of claim 13, wherein the cellulose derivative is a hydroxy ethyl cellulose, a hydroxy propyl cellulose, a methyl hydroxy propyl cellulose or a carboxy methyl cellulose.

15. The process of claim 11, wherein the hydrophilic colloidal inorganic filler comprises a pyrogenic silica or a pyrogenic alumina.

16. The process of claim 11, wherein the aqueous treatment solution comprises an anionic surfactant.

17. The process of claim 16, wherein the aqueous treatment solution comprises a hydrophilic polymer and/or a nonionic colloidal inorganic filler.

18. The process of claim 11, wherein the hydrophilic polymer and/or the colloidal inorganic filler represent 0.001 to 0.05% by weight of the total weight of the aqueous treatment solution.

19. The process of claim 18, wherein the hydrophilic polymer and/or the colloidal inorganic filler represent 0.005 to 0.62% by weight, with respect to the total weight of the aqueous treatment solution.

20. The process of claim 1, wherein the acidic pH of the aqueous treatment solution is adjusted by addition of lactic acid.

21. The process of claim 20, wherein the amount of lactic acid present in the aqueous treatment solution is from 0 to 0.01% by weight of the total weight of the solution.

22. The process of claim 1, wherein the aqueous treatment solution comprises a hydroxylamine salt and/or a hydrazine salt.

23. The process of claim 22, wherein the hydroxylamine salt and/or the hydrazine salt is a hydrochloride.

24. The process of claim 22, wherein the hydroxylamine salt and/or the hydrazine salt represent 0.02 to 0.1% by weight of the total weight of the aqueous treatment solution.

25. The process of claim 1, wherein the aqueous treatment solution comprising the surface-active agent comprises a dispersed pigment.

26. The process of claim 1, wherein the substrate comprises at least one polythiourethane, (meth)allyl polymer, (meth)acrylic polymer or thermoplastic polycarbonate.

27. The process of claim 1, wherein the coating is a hard abrasion-resistant or impact-resistant varnish.

28. The process of claim 27, wherein the coating comprises epoxysilane hydrolysate.

29. The process of claim 1, wherein the substrate is an ophthalmic lens.

30. An aqueous treatment solution, comprising a surface-active agent, a hydrophilic polymer and/or a hydrophilic colloidal inorganic filler, a hydrazine salt and/or a hydroxylamine salt, and an acid.

31. The aqueous solution of claim 30, further comprising, with respect to the total weight of the solution:
0.01 to 0.1% of at least one surface-active agent;
0.001 to 0.05% of the hydrophilic polymer and/or of the hydrophilic colloidal inorganic filler;
0.02 to 0.1% of a hydrazine salt and/or a hydroxylamine salt; and
up to 0.01% of acid.

32. The aqueous treatment solution of claim 30, wherein the acid is lactic acid.

33. The aqueous treatment solution of claim 30, wherein the surface-active agent comprises at least one anionic or nonionic surface-active agent.

34. The aqueous treatment solution of claim 33, wherein the surface-active agent comprises at least one sodium lauryl sulphate, sodium lauryl ether sulphate, triethanolamine lauryl sulphate, sodium dodecylbenzenesulphonate or PEG-9 octylphenyl ether.

35. The aqueous treatment solution of claim 30, wherein the hydrophilic polymer comprises at least one poly(vinyl alcohol), poly(ethylene glycol), polyacrylamide, polyvinylpyrrolidone or cellulose derivatives.

36. The aqueous treatment solution of claim 30, wherein the hydrophilic colloidal inorganic filler comprises at least one or more pyrogenic silica, or pyrogenic alumina.

37. The aqueous treatment solution of claim 30, wherein the hydroxylamine salt and/or the hydrazine salt is a hydrochloride.

38. The aqueous treatment solution of claim 30, farther comprising a dispersed pigment.

39. The process of claim 1, wherein the pH of the aqueous treatment solution is from 2 to 5.

* * * * *